United States Patent [19]
Tappe et al.
[11] 4,382,358
[45] May 10, 1983

[54] STRING OF A VINYLIDENE FLUORIDE SYNTHETIC RESIN COMPOSITION

[75] Inventors: Günther Tappe, Troisdorf-Sieglar; Bertram Gasper, Troisdorf-Spich; Herbert Laubenberger; Richard Weiss, both of Troisdorf, all of Fed. Rep. of Germany

[73] Assignee: Dynamit Nobel Aktiengesellschaft, Troisdorf, Fed. Rep. of Germany

[21] Appl. No.: 302,614

[22] Filed: Sep. 15, 1981

[30] Foreign Application Priority Data

Oct. 3, 1980 [DE] Fed. Rep. of Germany ....... 3037457
Oct. 3, 1980 [DE] Fed. Rep. of Germany ... 8026503[U]

[51] Int. Cl.³ ............ C08L 27/16
[52] U.S. Cl. ............ 57/243; 57/244; 57/250; 87/1; 87/8; 264/210.8; 428/394; 525/199; 525/72
[58] Field of Search ............ 525/199, 72; 57/243

[56] References Cited

U.S. PATENT DOCUMENTS 3,253,060 5/1966 Koblitz et al. ............ 525/199
3,524,906 8/1970 Schmitt et al. ............ 525/199
3,790,645 2/1974 Murayama et al. ............ 525/199
3,941,860 3/1976 Couchoud et al. ............ 525/199
4,039,634 8/1977 Couchoud ............ 525/199
4,339,499 7/1982 Tappe et al. ............ 428/373

FOREIGN PATENT DOCUMENTS 2914606 10/1980 Fed. Rep. of Germany .

*Primary Examiner*—Carman J. Seccuro
*Attorney, Agent, or Firm*—Antonelli, Terry & Wands

[57] ABSTRACT

A string for the stringing of rackets, bows, musical instruments and the like has a thread-like structure comprising at least one monofil of a synthetic resin mixture containing 99–86% by weight of polyvinylidene fluoride and 1–14% by weight of at least one polyacrylate. The monofil is melt-extruded and is stretch-oriented to impart improved elasticity thereto.

13 Claims, 5 Drawing Figures

ELASTICITY AS A FUNCTION OF PRETENSIONING FORCE OF:
(1) NATURAL GUT STRINGS, (2) "SYNTHETIC RESIN STRINGS" OF PA,
(3) PVDF MONOFIL STRING, (4) MONOFILS OF MODIFIED PVDF

TORSION PENDULUM TEST ACCORDING TO DIN 53 445 OF:
(1) NATURAL GUT STRINGS, (2) "SYNTHETIC GUT STRINGS" OF PA,
(3) PVDF MONOFILS, (4) MONOFILS OF MODIFIED PVDF

STRING OF A VINYLIDENE FLUORIDE SYNTHETIC RESIN COMPOSITION

The invention relates to a string suitable for tennis rackets and like applications comprising at least one synthetic resin monofil.

Strings consisting at least partially of a synthetic resin are conventional, see, for example, DOS (German Unexamined Laid-Open Application) No. 2,728,339 and DOS No. 1,703,132. The strings are utilized for various purposes, especially as strings for musical instruments, as well as for stringing rackets, especially tennis, squash, badminton rackets, etc., and also as strings for bows and crossbows, and here the above enumeration merely cites examples. For all of these applications, the strings, bow strings, or the like must exhibit specific properties with respect to the tensile strength and the elongation upon short-term and repeated stress. After such a stress, the strings or the like must return rapidly and completely to their initial length. Finally, the strings or the like are to possess also a high strength under the various conditions occurring during use, especially a high abrasion resistance, a good flexibility, an extensive independence of the properties from tht environmental conditions, as well as in total a high stability with respect to the various loads to which the strings are exposed during mounting to the various supports for which the strings are intended. The profile of the requirements for tennis racket strings is shown, for example, in the periodical Test, No. 6, (1978), pp. 512–517.

Gut strings have been used for a long time for musical instruments and for stringing high-quality tennis rackets. The recuperative capacity of these gut strings, i.e., their capability of rapidly and completely reassuming the original length after a short-term or repeated stress, is excellent. Furthermore, in case of gut strings, the increase in length or the elongation, in dependence on the tensile force exerted, is linear and remains practically unchanged from one load cycle to the next, which is evidence of sluggish flow. However, all tensile elongation force curves exhibit steps or jumps produced by the onset of tearing of certain individual fibers or also the unraveling or untwining of turns of the strings provided with a twist. The above-described phenomena correspondingly reduce the lifetime of gut strings. In gut strings, the lifetime is clearly proportional to the diameter thereof; however, on the other hand, it is not readily possible to simply increase this diameter since this leads to various disadvantages, namely, in particular, with respect to the elasticity of the string under tensile stress.

Furthermore, gut strings do not exhibit a uniform quality, either, since this quality depends on the gut utilized (sheep, cattle, pig gut), as well as on the storage conditions for the strings and on the moisture conditions ambient at the moment the strings are used. Since natural gut strings show a high moisture absorption, a consequence of which is the occurrence of dimensional changes, i.e., elongations of the string, th elastic characteristic changes very considerably and to the disadvantage of the players. Moreover, gut strings are pronouncedly expensive to manufacture.

In recent times, a number of different strings has been developed, consisting at least partially of a synthetic resin, especially thermoplastic synthetic resins. These strings, as hereafter described, have a structure which frequently is more or less complicated, for example:

1. Monofil strings, heretofore, have been conventionally extruded from polyamide, such as nylon, from modified polyvinyl chloride, from polyurethane, or from a polyester, such as polyethylene terephthalate, or also from a polyolefin such as polyethylene or polypropylene. The manufacture of these strings is economical and thus desirable, and the strings exhibit high strength during use. (It will be understood that the term "monofils" refers to relatively-thick, extruded fibers or threads having a diameter of at least 0.1 millimeter, preferably up to 1.5 millimeters which are extruded as individual fibers.) However, these monofil strings have the disadvantage that—even after being stressed by a relatively weak tensile force—the strings return only gradually into their initial condition, due to their internal friction, and the disadvantage that the strings experience irreversible lengthening under a relatively-high tensile stress. Besides, extruded monofil strings become brittle, inter alia, at low temperatures; this holds true expecially for polyamide strings.

2. Other strings consisting of a bundle of parallel multifilaments, which are not impregnated into the core and, which are merely surrounded, namely, entirely on the outside, by an envelope or casing of an extruded synthetic resin material. The thus-constructed strings exhibit the disadvantage that the strings show little resistance to bending stresses and in practical usage, the thin envelope has only a poor abrasion resistance.

3. Another group of strings are in the strings of a flat bundle of parallel multifilaments impregnated by extrusion with a thermoplastic material, for example, with a polyamide, wherein the flat bundle (or the strap, or the ribbon) obtained in this way is subsequently twisted at an elevated temperature. The strings produced in this way exhibit the disadvantage that the turns unravel when the string is subjected to tensile stress.

4. Yet another group of strings represents a combination of the aforementioned types of strings with respect to their structure. For example, these strings include strings with a monofil, an extruded core of a thermoplastic material which is surrounded, for reinforcement purposes, with windings of a thread, a strap, or a ribbon, or which is surrounded by a casing or a braided envelope, wherein the casing is impregnated. The provision of a reinforcing thread or the like increases the tear strength of the string only if its ultimate elongation is higher than that of the other string component, e.g., a thread or filament to be reinforced. In general, the reinforcing threads, for example, metal, carbon, or boron filaments, have a higher ultimate tensile strength and a higher modulus of elasticity, but a lower ultimate elongation than the string component, e.g., the monofil to be reinforced. If the ultimate elongation of the reinforcing thread is exceeded, then the original thread or filament which is reduced in cross section, is the sole bearer of the stress. Besides, such multifilament strings are considerably more expensive in their manufacture than the monofil strings.

The predominant part of the strings presently manufactured, which consist at least partially of a synthetic resin, have hysteresis curves disclosing an initial flow and indicating that, after a number of successive stresses, a permanent elongation remains. For all these reasons, the presently available strings produced from synthetic resin materials are not fully satisfactory, especially if the strings are to be used as stringing for tennis rackets. Although the conventional strings wherein at least one process step takes place for the extrusion of thermoplastic materials, particularly, for the production of a monofil core or an impregnation of a band of multifilaments, can be manufactured very economically as well as continuously and rapidly, the artificially-produced strings are, on the other hand, not competitive in quality with the natural gut strings, namely, primarily due to the specific properties, especially the inadequate recovery power of the thermoplastic materials employed as well as the insufficient elasticity.

The multifilament synthetic resin strings are still inferior as a tennis racket stringing to the high-quality natural gut strings with regard to playing characteristics, and are at most comparable to the lower quality natural gut strings. Furthermore, the purely synthetic resin monofls exhibit the poorest playing properties, due primarily to an inadequate elasticity. In the production of conventional monofil and multifil or multifilament synthetic resin strings, polyamide 6 and 6.6, as well as, to a minor extent, polyethylene terephthalate are preferably utilized.

Furthermore, another disadvantage to natural gut strings as well as synthetic resin strings, especially of polyamide, is the moisture absorption and emission, respectively. Depending on the respective atmospheric humidity and the ensuing moisture content of the strings, the strings, in their strung condition, can contrast or expand in length. Even in case of a synthetic resin of such high quality as polyamide 6 and 6.6, dimensional variations of about 2% are still observed upon a change in relative atmospheric humidity of 25–80%; in case of natural gut strings, these variations are about 4%. On account of these dimensional changes, a reduction in the pretensioning force of the tightened string occurs with an increase in the moisture content of the strings; thus, for example, the stringing of a tennis racket becomes relaxed and the ball is no longer accelerated. Upon a reduction in the moisture content of the strings, on the other hand, a shortening of the strings occurs and the pretensioning forces are increased; the tightened string becomes harder. A particular disadvantage of strings made of polyamide is due to the fact that, with a moisture content of the polyamide of about 3% occurring at atmospheric humidities of 50% relative humidity, the glass transition zone of polyamide 6 and 6.6 is already at about 20° C. For this reason, these strings have a high attenuation and the strings exhibit a poorer restoring power due to internal friction. Besides, in these polyamide strings, strong variations in elasticity are experienced in case of temperature changes.

In German patent application No P 29 14 606.3, a string has been suggested made of a synthetic resin material, which is better adapted to the gut strings and simultaneously exhibits the advantages of the conventional strings of synthetic resin materials. This string consists of at least one monofil of polyvinylidene fluoride (PVDF).

It has now been found that these synthetic resin strings of polyvinylidene fluoride do not exhibit a high attenuation at room temperature and thus rebound faster; that these strings are, at the same time, substantially more elastic than all heretofore known synthetic resin strings, and that these strings do not age as quickly. Strings of polyvinylidene fluoride approximate with respect to their elasticity and their elastic characteristics, the properties of high-quality natural gut strings. Moreover, as compared with strings of natural gut and especially polyamide, the disadvantage inherent in the polyamide due to dimensional changes by moisture absorption is avoided, since moisture absorption of polyvinylidene fluoride in the saturated condition is below 0.2%. This means that polyvinylidene fluoride is substantially more moisture-resistant than the nowadays customary synthetic resin strings of polyamide. This holds true, in particular, for the temperature range from +15° to 50° C., which is important for practical use. Besides, strings of polyvinylidene fluoride are among those of all synthetic resin monofils which have maximum weatherability.

The elasticity of the polyvinylidene fluoride monofil, with a pretensioning strength of the string in the range between 170 and 320 N, is adapted to that of a natural gut string. This elasticity of the polyvinylidene fluoride monofil can be set for the thicknesses under consideration so that identical playing properties are attained independently of the thickness. Another essential property resides in that the relaxation of the polyvinylidene fluoride monofil is equal to or lower than in natural gut strings, with a comparatively applied pretensioning strength of 200 N. Accordingly, the strings made from polyvinylidene fluoride monofils are distinguished by high elasticity with a low relaxation. The elasticity for the string of polyvinylidene fluoride monofils, with a pretensioning strength of 200 N, can reach between 2.0 to $5.0 \cdot 10^{-4}$ $N^{-1}$, preferably approximately $3.3 \cdot 10^{-4}$ $N^{-1}$.

The ratio between high elasticity of the monofils and low relaxation thereof, required for a string, especially also for stringing ball game rackets, is attained in polyvinylidene fluoride monofils by axially stretching the polyvinylidene fluoride monofil at a ratio between 1:3 to 1:10, preferably 1:4 to 1:5. By the choice of the stretching temperature, the stretching conditions, and the residence time, the elasticity can be greatly varied above an elongation of 7–8%. Thus, it is possible to produce strings having the desired elasticity merely by a stretching step under heated conditions. However, if these strings have been strung a relatively long period of time, it is found that, on the one hand, tension is reduced while, on the other hand, the elasticity drops as well. Therefore, to set the elasticity desired at room temperature and to make the elasticity uniform over long periods of time, a preliminary stretching step is executed at elevated temperatures so that the strings have an elasticity higher by about 40–70% than desired, and the elasticity is brought to the desired value by at least one subsequent stretching step under cold conditions. By the level of the respectively applied tension, the length of the linear dynamic elongation range can be determined.

It is thus especially advantageous to subject the polyvinylidene fluoride monofils to at least one more cold stretching step. By this subsequent stretching operation, the relaxation of the monofil is decreased, in particular, but the elasticity is likewise reduced, along with the ultimate elongation. Therefore, this subsequent stretching step has its limits.

A preferred field of application of monofils of polyvinylidene fluoride is the use as stringing of ball rackets, especially tennis rackets. In this utilization, the advantages of high weatherability and unresponsiveness to moisture are fully exploited. Additionally, monofil strings of polyvinylidene fluoride combine playing characteristics approaching those of high-quality natural gut strings with a corresponding elasticity and relaxation behavior. However, it has been found that monofils of polyvinylidene fluoride have, in the temparature range from −20° to 30° C., a low attenuation, measured with a measuring frequency of about 1 Hz. Due to this low attenuation and the concomitant low energy dissipation, stringing systems with monofils of polyvinylidene fluoride has a very good ball acceleration. However, the vibrations imparted to the stringing of polyvinylidene fluoride monofils by the impact of a ball fade rather gradually, so that arm joints are placed under mechanical stress for a relatively long time period. It is possible, of course, to utilize ball rackets having a higher inherent attenuation by constructing the frame of the ball racket correspondingly, so that even monofils of polyvinylidene fluoride exhibit, with such rackets, only a very brief reverberation. Such ball rackets with stringing of pure polyvinylidene fluoride monofils are gentler on the arm and yet show a satisfactory ball acceleration.

Yet, the problem exists of eliminating also in monofils on the basis of polyvinylidene fluoride the aforedescribed disadvantage of low attenuation especially in the temperature range from −20° to +30° C., to shorten the reverberating of the strings, and simultaneously to retain the excellent properties when using polyvinylidene fluoride for strings.

This problem has been solved according to this invention in a string of at least one monofil of a synthetic resin by using a synthetic resin mixture consisting of 99–86% by weight of polyvinylidene fluoride and 1–14% by weight of at least one polyacrylate. By the use of a polyacrylate in addition to the polyvinylidene fluoride, attenuation can be increased, i.e., it has been made possible thereby to shorten the reverberation of the respective monofils under a corresponding load.

Preferred polyacrylates are homopolymers such as polymethyl methacrylate, polymethyl acrylate, polyethyl acrylate and polypropyl acrylate, or mixtures of these polyacrylates. An advantageous further development of the synthetic resin mixture for the monofils according to this invention provides that the polyacrylates used are copolymers of the vinylidene fluoride monomer with at least one acrylate monomer, preferably selected from the group of the alkyl acrylates or alkyl methacrylates, wherein the alkyl groups are preferably lower alkyl groups of 1–4 carbon atoms and wherein the acrylate proportion of the mixture is calculated from the acrylate proportion of the copolymers. Preferably employed are mixtures of polyvinylidene fluoride, pure acrylates, and vinylidene fluoride-acrylate polymers. Monofils produced from such blends can be adjusted with respect to their damping behavior, and the damping especially in the desired temperature range of −20° to +30° C. can be increased to a degree as it is especially desirable in the use as stringing for ball rackets, and as it is known from natural gut strings.

The acrylate copolymers of vinylidene fluoride monomers with at least one acrylate monomer are copolymers prepared from a monomeric mixture containing 0–30% by weight of the above-described acrylate monomer and 90–70% by weight of vinylidene fluoride. The copolymer having such a composition can be of a type as manufactured by suspension polymerization, emulsion polymerization, graft polymerization, or by some other suitable polymerizing method.

A preferred blend for producing the monofils contains, besides polyvinylidene fluoride, up to 8% by weight of at least one polyacrylate homopolymer and up to 25% by weight of at least one polyvinylidene fluoride-acrylate copolymer. A weight ratio is preferred wherein polyvinylidene fluoride amounts to 90–95% by weight of the mixture and the acrylate components contained therein amount to 10–5% by weight. By changing the proportions of polymethyl methacrylate or the methyl, ethyl, and propyl acrylate proportions in the polyvinylidene fluoride copolymers, the attenuation curves of the total mixture for the monofils can be adjusted so that the reverberation of strings made from the monofils can be minimized.

The invention has an especially good effect if the string is made of at least one monofil, and fully proves itself in case of a monofil string, which is of maximum interest from an economic viewpoint, combining the advantages of natural gut strings with the heretofore known advantages of synthetic resin strings. However, the string can also consist of several monofils of a mixture of polyvinylidene fluoride and at least one polyacrylate, which are twisted, braided, plied, or similarly joined together. This is also to cover strings of a complete structure, exhibiting still other additional components besides synthetic resin monofils.

With the great stress to which strings are exposed in the tensioned operating condition, wearing through can occur even in case of the monofils of this invention at the points of intersection of two strings. To avoid this, the invention proposes to coat the surface of the monofil so that frictional resistance is lowered and abrasion resistance is raised, for example, with polytetrafluoroethylene or silicone oils. The increased abrasion resistance prolongs service life. This is also advantageous for these strings when used as stringing for ball rackets. Such coating also makes these strings more advantageous than strings of natural gut.

The string of this invention is essentially characterized by its elasticity, which is essentially dependent on the properties of the polyvinylidene fluoride in the monofil.

As in the case of other macromolecular compounds, some of the properties of polyvinylidene fluoride, especially the degree of crystallinity, depend on the thermal prehistory of the material as well. While an extensively-amorphous material of good flexibility is produced by rapid cooling after processing, a gradual cooling or tempering at about 135° C. leads to highly crystalline materials which, with a higher density, exhibit a higher modulus of tension and flexion and have an improved long-term stability. The process for producing a string in accordance with the invention provides that a rod of polyvinylidene fluoride and polyacrylate is extruded at a melt temperature of the polyvinylidene fluoride of between 250° and 350° C., preferably between 260° and 280° C., and cooled to a temperature of between 60° and 150° C., preferably between 130° and 145° C., and is axially stretched at this temperature, whereupon the thus-obtained monofil is cooled to room temperature (about 20° C.) and then stretched under these cold conditions. By the combination according to this invention of the process steps of warm-stretching and a cold, but relatively minor subsequent stretching of the monofils, the excellent properties required for a string are attained, namely, an elastic behavior approaching that of natural gut strings and remaining uniform over long periods of time, and a reduction in the relaxation of the polyvinylidene fluoride to a value acceptable for playing characteristics. Preferably, the cold stretching of the monofil is conducted to such an extent that an elongation of the monofil takes place by 1–3%. This extent of cold stretching is sufficient to attain the desired reduction in relaxation. During the subsequent cold-stretching step, the knot tear strength and the ultimate elongation are hardly altered practically, whereas the elasticity rises somewhat. The attainable elasticity, knot tear strength, and ultimate elongation of the monofil also depend on the temperature at which the warm-stretching step is carried out. The temperature during the warm stretching and also the stretching ratio, preferably chosen to be between 1:3 and 1:10, preferably, 1:4 to 1:5, likewise depend on the required final thickness or diameter of the monofil string. To obtain, for example, a final thickness of 1.2 to 1.5 mm for a monofil string, the thickness of the rod to be stretched must be chosen to be between 2.7 and 3.4 mm at a stretching ratio of 1:5 and between 3.4 and 4.2 mm at a stretching ratio of, for example, 1:8.

It is also advantageous to subject the monofils, warm-stretched at a temperature of between 130° and 145° C., prior to cooling to room temperature, furthermore to a temperature lying somewhat above the stretching temperature, to diminish stresses.

The desired cold-stretching step is achieved according to this invention, for example, by winding up the monofil with a uniform tensile force of at least 200 N, preferably 230–280 N, (N=Newton=kg·m/sec$^2$) and allowing it to remain wound up under tension for at least five minutes, preferably for up to one hour or optionally longer, until it is passed onto its use after having been relieved of its tension.

For the preferred use of the string of this invention as stringing for ball rackets, especially tennis rackets, monofils are employed having an elasticity of $2.7\text{–}3.6\times10^{-4}\ N^{-1}$ with a pretensioning force of 200 N, an ultimate elongation of 16–30%, a tear strength of between 300 and 500 N/mm$^2$, with a diameter of 1.2–1.5 mm.

The invention will be explained in greater detail below using a tennis racket string as the example. The properties of significance for practical use of the string of this invention made of polyvinylidene fluoride and polyacrylate for stringing tennis rackets will be briefly described below. It is furthermore to be noted that strings for tennis rackets, when being strung, are tightened with a pretensioning force, depending on the type of game of the player, of between 150 N and 300 N, preferably about 200 N. The following requirements result.

(a) Tensile Strength:

On the basis of the stress-strain diagram of a tennis ball, an estimate can be made that about 50–250 N of force is absorbed by the stringing of the tennis racket. These forces are distributed among the individual strings of a tennis racket in various ways. Since, in general, the longitudinal strings have a higher pretensioning than the transverse strings, these forces are absorbed to a greater degree by the longitudinal strings and to a lesser degree by the transverse strings. The force exerted by a ball on a string should, per estimate, not be more than 50 N in case of average players. This force is added to the pretensioning force of a string of 160–300 N, by which a string is pretensioned during mounting.

(b) Tension Relaxation:

The tennis racket strings are pretensioned, depending on the player and the type of game, with 160–300 N, predominantly with 200 N during stringing. With an increasing tension, the deformation distance is reduced and the contact time between the ball and the stringing is shortened so that generally the guidance of the ball is poorer and a high speed of the tennis racket is required for accelerating the ball. The tension of the strings should vary with the time to a minimum extent, i.e., the tension relaxation is to be low. Furthermore, the tension is to change only to a minimum extent due to the effects of temperature and moisture.

(c) Knot Tear Strength:

The strings must have an adequate knot tear strength, but it is possible to reduce the force acting on the knot by repeatedly turning the string during stringing.

(d) Elasticity Behavior:

One of the most important properties of the tennis racket strings is the elasticity behavior in case of tensile forces of about 200 N. This can be varied within a certain range, due to the nonlinearity of the stress-strain diagram, by the choice of the tension and/or by the diameter of the strings. This property has an effect on the ball acceleration, the ball control, and the stress on the elbow joint. Too long a deformation path causes too low a ball acceleration, and a deformation path which is too short causes a poor ball control. the natural gut strings, according to all experience gained heretofore, exhibit an elasticity behavior ensuring a satisfactory ball control and acceleration as well.

(e) Restoring Power:

The string, after short-term stress, is to return rapidly to its initial condition. This means that the internal friction of the material utilized is to be low. However, if the internal friction is too low, an undesired reverberation occurs, for example, in ball rackets. A measure for inner friction is the attenuation.

(f) Abrasion Resistance:

The wear characteristic is determined, on the one hand, by the rubbing together of two strings at the points of intersection of a stringing, but, on the other hand, also by dust and dirt.

The following description relates to the manufacture of a monofil string from a polyvinylidene fluoride modified according to this invention, which is to be used as a tennis racket string, and this string is investigated with respect to its properties and compared with a multifil high-quality synthetic resin string of polyamide (PA) of the type "Hy-O-Sheep" by Rucanor GmbH, Cologne, and a natural gut string of the type "Victor Imperial" by Hoffman von Cramm KG, Unteraching, and a monofil string of pure polyvinylidene fluoride. The monofil of this invention to be evaluated consists of 79% by weight of polyvinylidene fluoride and 3.5% by weight of PMMA (polymethyl methacrylate) and 17.5% by weight of a vinylidne fluoride-ethyl acrylate graft polymer with 20% by weight of ethyl acrylate. Table 1 shows the compilation of a comparison of the mechanical properties in tabular form for the monofil strings described herein.

The string of this invention as well as the properties of the string made of the modified polyvinylidene fluoride (i.e., containing polyacrylates) as compared with the above-specified natural gut string, the synthetic resin string of polyamide, and a monofil of polyvinylidene fluoride are illustrated in the accompanying figures, wherein:

FIG. 1 is a perspective view of a monofil made from the modified polyvinylidene fluoride of this invention;

FIG. 1*a* is a perspective view of a twisted bundle of three modified polyvinylidene fluoride monofils;

Figure 3:
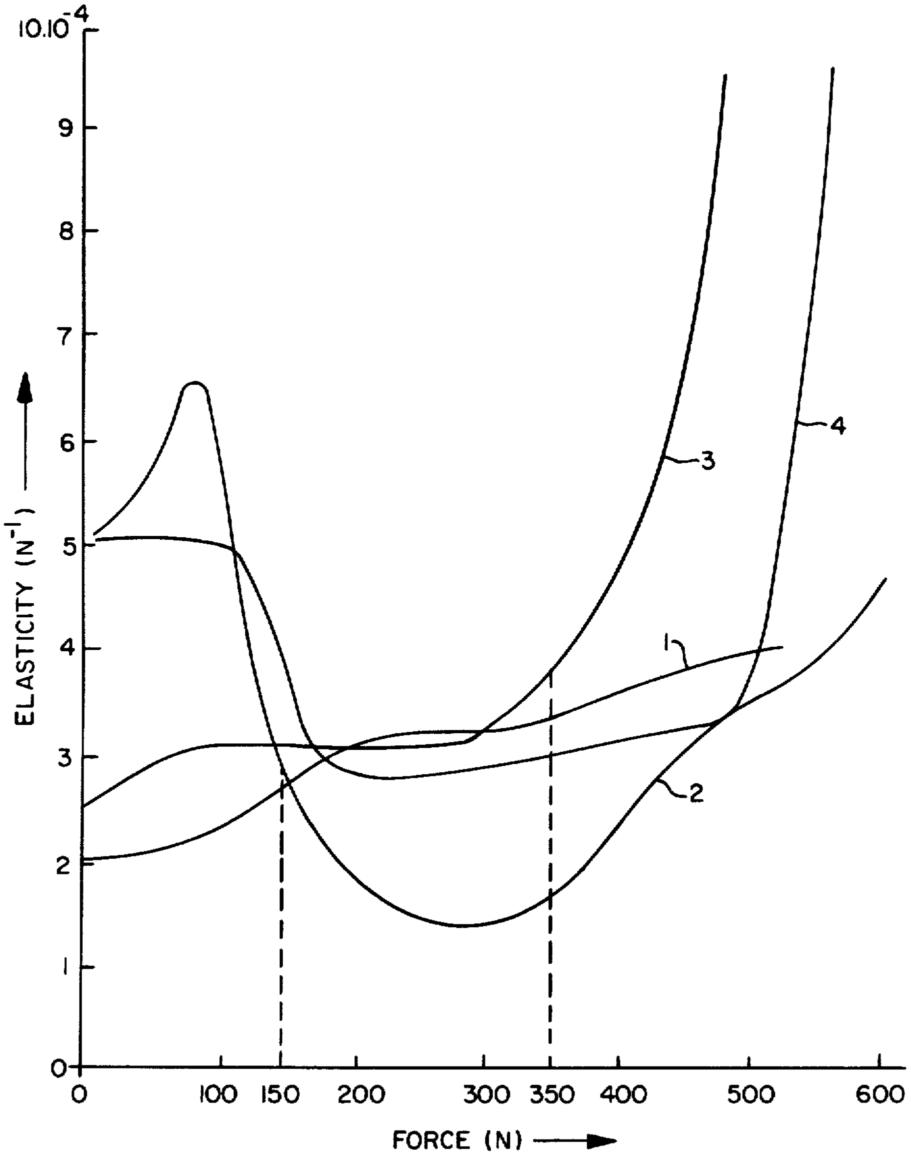
FIG. 3 shows the elasticity as a function of the pretensioning force applied to each string.

The elasticity $\alpha$ indicated in the following table and in FIG. 3 is defined as the ratio of the change in elongation $\Delta\epsilon$ at a change in force $\Delta\kappa$ $$\alpha = \Delta\epsilon/\Delta\kappa$$

$\Delta\epsilon$ = change in elongation
$\Delta\kappa$ = change in force
for a reversible deformation.

The tear strength was determined according to DIN 53 455. Concerning the knot tear strength, a knot was made in the thread to be tested, and then the tear strength was measured on the thread in the tensile strength test according to DIN 53 455. The characteristic values are compiled in Table 1.

Abrasion resistance was determined by means of a special test instrument. Two strings are clamped in place in intersecting relationship, each with a pretensioning force of 200 N. The tensioning clamps for one string are fixed, the tensioning clamps for the other string are movable. The movable string is pulled from about under the fixed string and extended upwardly. With a speed of 100 cycles per minute, this string is moved to and fro. The point of intersection of both strings can shift to and fro during testing by about 10 mm. The abrasion resistance determined with this device is most advantageous in case of the tennis racket strings made of polyamide. The natural gut strings differ very greatly with respect to abrasion resistance. There are strings which rupture already after 600 cycles, whereas other rupture only after 2000 cycles. PVDF monofils exhibit an abrasion resistance slightly poorer than that of natural gut strings. In contrast, PVDF monofils and/or modified PVDF monofils according to the invention, the surface of which has been coated, for example, with "Teflon," exhibit abrasion resistance values substantially higher than those of natural gut strings. These properties are shown in the following Table 1.

properties as compared with strings made purely of PVDF.

Figure 1:
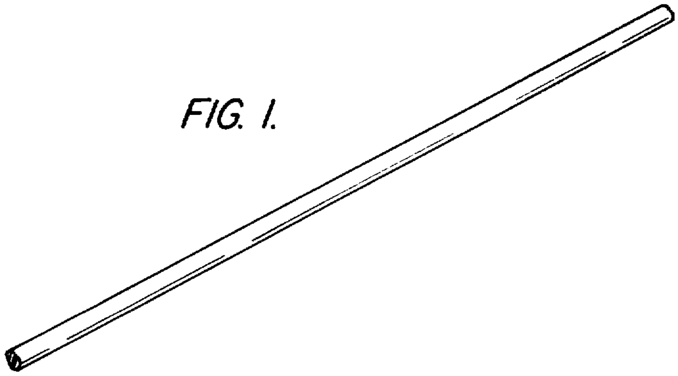
Figure 1A:
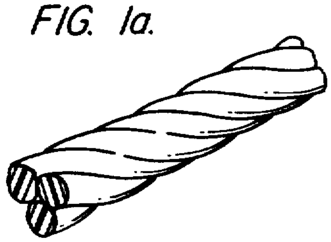
Figure 2:
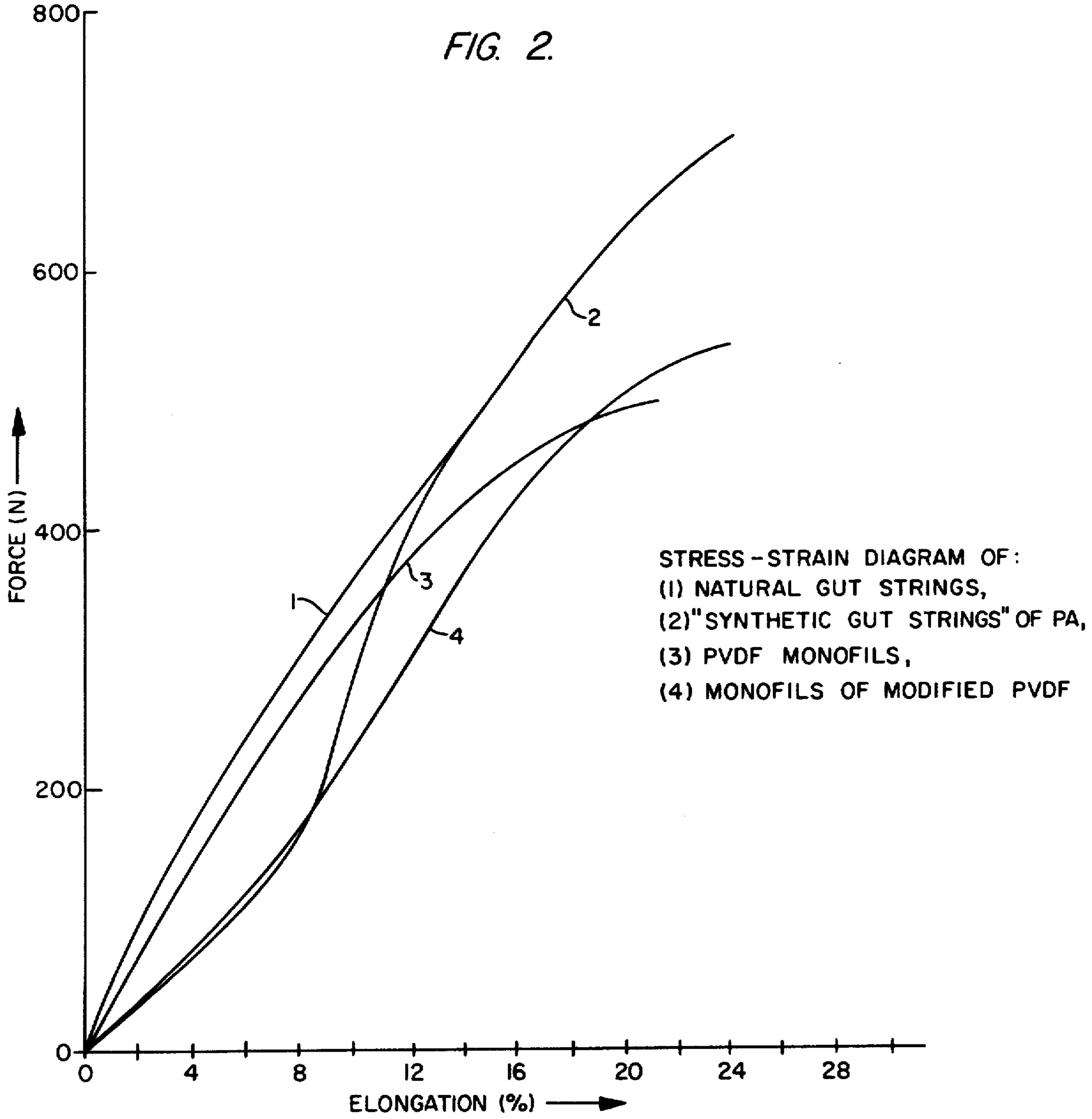
FIG. 2 shows a stress-strain diagram for the different strings.

The stress-strain diagram of FIG. 2 shows the characteristic differences in natural gut strings and synthetic resin strings. A striking feature here is, in particular, that the polyamide strings exhibit a great force increase at higher elongations. The elasticity can be determined from the stress-strain diagram of FIG. 2 in accordance with the above-described formula, and is illustrated as a function of the pretensioning in FIG. 3 for the various strings. It can be seen that monofils on the basis of polyvinylidene fluoride exhibit, at pretensioning forces of about 150 N to 350 N, approximately the same elasticity as high-quality natural gut strings. In contrast thereto, the synthetic resin strings of polyamide show a substantially-lower elasticity at a pretensioning force of 200 N.

Figure 4:
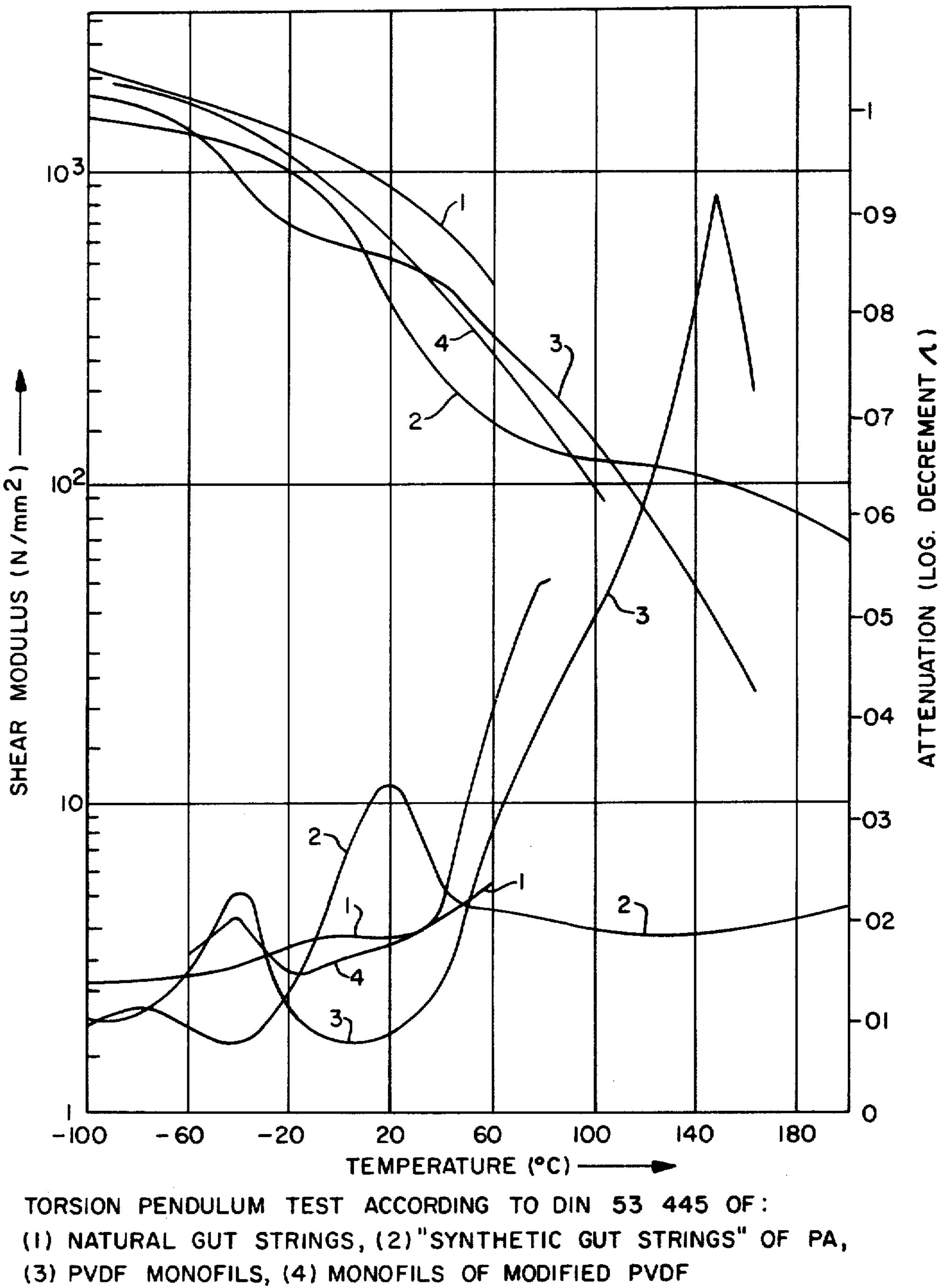
FIG. 4 shows the dependency of the shear modulus and attenuation on the temperature.

FIG. 4 shows the temperature curves of the linear modulus and the attenuation, measured in a torsion pendulum test according to DIN 53 445. The strings of natural gut and on the basis of polyvinylidene fluoride change their shear modulus in a temperature range up to +20° C. only to an insignificant extent. In contrast thereto, synthetic resin strings on the basis of polyamide undergo extensive changes in this temperature range, which is due to the fact that the glass transition temperature of the polyamide is lowered by the relative humidity content, wherein moisture saturation at 23° C. and 50% relative humidity signifies a glass transition temperature of 20° C.

A comparison of the attenuation curves of natural gut string, polyamide string, pure PVDF monofil, and acrylate-modified PVDF monofil according to this invention as illustrated in FIG. 4 shows that the highest attenuation is exhibited by the saturated polyamide string in the temperature range to be considered under practical conditions, at 23° C. and 50% relative humidity. In contrast, a completely dry polyamide string has a very low attenuation. A markedly lower attenuation is exhibited by the natural gut string, saturated with moisture at 23° C. and 50% relative humidity. The lowest attenuation is displayed by the pure PVDF string. Such a low attenuation means that such strings will reverberate longer, causing a longer-term vibration of a ball racket.

TABLE 1

Comparison of Mechanical Properties

| String | Density $g/cm^3$ | Thickness (mm) | Tear Strength (N) | Ultimate Elongation % | Knot Tear Strength (N) | Abrasion Resistance Number of Cycles |
|---|---|---|---|---|---|---|
| Natural gut string (1) "Victor Imperial" | 1.33 | 1.3 | 440 | 15 | 200 | 2000–15000 |
| Synthetic resin string (2) PA "Hy-O-Sheep" | 1.11 | 1.4 | 750 | 25 | 400 | 50 000 |
| PVDF Monofil string (3) | 1.78 | 1.3 | 480 | 20 | 350 | 300–2000 |
| Acrylate-modified PVDF monofil string (4) | 1.68 | 1.3 | 570 | 28 | 350 | 2000 |
| Acrylate-modified PVDF string with "TEFLON" coated surface | 1.68 | 1.3 | 570 | 28 | 350 | 20000–50000 |

A comparison of the characteristic values of tennis racket strings made of monofils from acrylate-modified PVDF according to this invention with high-quality natural gut and "synthetic resin strings" shows that the modified PVDF monofil string does not exhibit a large number of the disadvantages displayed by the natural gut strings as well as the conventional synthetic resin strings, and is substantially improved in its attenuation properties as compared with strings made purely of PVDF.

The polyacrylate-modified PVDF string of this invention displays a desirable attenuation characteristic approaching that of natural gut string in the temperature range under consideration.

What is claimed is:

1. A string for the stringing of rackets, bows, musical instruments and the like, comprising a thread-like structure having at least one monofil of a synthetic resin mixture containing 99–86% by weight of polyvinylidene fluoride and 1-14% by weight of at least one polyacrylate selected from the group consisting of a polyacrylate homopolymer, a copolymer of vinylidene fluoride monomer with at least one acrylate monomer, and mixtures thereof, which is stretch-oriented to impart improved elasticity thereto; said monofil exhibiting an attenuation between −20° C. and 30° C. that closely approaches that of natural gut string.

2. A string according to claim 1, wherein the polyacrylate comprises polymethyl methacrylate, polymethyl acrylate, polyethyl acrylate, polypropyl acrylate, and mixtures thereof.

3. A string according to claim 1, wherein the polyacrylate comprises a copolymer of vinylidene fluoride monomer with 10–30% by weight of at least one acrylate monomer selected from the group of the alkyl acrylates and alkyl methacrylates, wherein the alkyl groups are lower alkyl groups of 1–4 carbon atoms and wherein the acrylate proportion in said mixture is calculated from the acrylate content of the copolymer.

4. A string according to one of claims 1-3, wherein the synthetic resin mixture comprises a mixture of polyvinylidene fluoride, polymethyl methacrylate, and vinylidene fluoride-alkyl acrylate or alkyl methacrylate copolymer.

5. A string according to claim 1, wherein the vinylidene fluoride-acrylate copolymer contains 10–30% by weight of the acrylate monomer.

6. A string according to claim 1, wherein the synthetic resin mixture contains, besides polyvinylidene fluoride, 1 to 8% by weight of a polyacrylate homopolymer, and up to 25% by weight of a vinylidene fluoride-acrylate copolymer.

7. A string according to claim 1, wherein the synthetic resin contains 90–95% by weight of polyvinylidene fluoride and 10–5% by weight of at least one polyacrylate.

8. A string according to claim 1, wherein said string consists of a bundle of monofils which are twisted, braided or otherwise connected with each other.

9. A string according to claim 1, wherein the monofil is axially stretched in a ratio of between 1:3 to 1:10, and preferably 1:4 to 1:5.

10. A string according to claim 9, wherein the monofil is subjected to subsequent stretching, wherein this subsequent stretching step effects an elongation of the monofil of between 1 and 3%.

11. A string according to claim 1, wherein the monofil is provided with a coating with reduces the coefficient of friction.

12. A string according to claim 1, wherein the monofil is useful for stringing for ball rackets, wherein the monofils have an elasticity of 2.7 to $3.6 \times 10^{-4}$ $N^{-1}$ at a pretensioning force of 200 N, an ultimate elongation of 16–30%, a tear strength of between 300 and 500 $N/mm^2$, with a diameter of 1.2–1.5 mm.

13. A process for the production of a string of a synthetic resin based on polyvinylidene fluoride which comprises extruding a synthetic resin rod from a melt consisting essentially of a synthetic resin mixture containing 99–86% by weight of polyvinylidene fluoride and 1–14% by weight of at least one polyacrylate selected from the group consisting of a polyacrylate homopolymer, a copolymer of vinylidene fluoride monomer with at least one acrylate monomer, and mixtures thereof at a melt temperature of 250°-350° C., cooling the resulting rod to a temperature of 60°-150° C. with subsequent axial stretching of the cooled rod at a ratio of 1:3 to 1:10; cooling the rod further to room temperature, subjecting the thus-obtained monofil to elongation by winding the monofil on a support with a uniform tensile force of from 150–300 N and thereafter storing the wound monofil for a period of from 5 to 60 minutes.

* * * * *